United States Patent [19]
Rosenstein et al.

[11] 3,818,313
[45] June 18, 1974

[54] SWITCHED TRANSISTOR POWER INVERTER CIRCUIT WITH SATURABLE REACTOR CURRENT LIMITING MEANS

[75] Inventors: Allen B. Rosenstein, Los Angeles; Michael C. Stolowitz, Sherman Oaks; Bruce L. Wilkinson, Torrance, all of Calif.

[73] Assignee: Pioneer Magnetics, Inc., Santa Monica, Calif.

[22] Filed: Apr. 23, 1973

[21] Appl. No.: 353,225

[52] U.S. Cl. .............................. 321/45 R, 321/25
[51] Int. Cl. ............................................ H02m 7/52
[58] Field of Search .................................. 321/45 R

[56] References Cited
UNITED STATES PATENTS

| | | | |
|---|---|---|---|
| 3,317,816 | 5/1967 | Wilting | 321/45 R |
| 3,340,457 | 9/1967 | Schmitz | 321/45 R |
| 3,350,624 | 10/1967 | Annunziato et al. | 321/45 R X |
| 3,417,315 | 12/1968 | Corey | 321/45 R |
| 3,524,990 | 8/1970 | Bajpai et al. | 321/45 R |

*Primary Examiner*—William M. Shoop, Jr.
*Attorney, Agent, or Firm*—Jessup & Beecher

[57] ABSTRACT

A power inverter circuit is provided which includes a transformer and a pair of switching transistors. The switching transistors connect the primary winding of the transformer to a direct-current source in an alternate manner, so that the polarity of the voltage applied to the winding is cyclically reversed in order to produce an alternating-current in the winding. In accordance with the invention, a saturable reactor is connected in circuit with the switching transistors to prevent each transistor from conducting a relatively large current before the voltage across such transistor drops to a minimum, so that switching losses in power inverter may be reduced.

4 Claims, 11 Drawing Figures

PATENTED JUN 18 1974

SATURABLE REACTOR WITH
LOW COERCIVE FORCE
MATERIAL

SATURABLE REACTOR WITH
HIGH COERCIVE FORCE
MATERIAL

COMPOSITE
CHARACTERISTICS
FOR STACKED
CORES

SWITCHED TRANSISTOR POWER INVERTER CIRCUIT WITH SATURABLE REACTOR CURRENT LIMITING MEANS

BACKGROUND OF THE INVENTION

Power inverter circuits are known to the art which serve to transform direct-current voltages into alternating-current voltages. Such power inverter circuits often employ transistor switches to connect the primary winding of a transformer across a direct-current voltage source. The transistor switches cause the direct-current voltage from the source to be cyclically reversed as applied to the primary winding of the transformer so as to produce an alternating-current in that winding.

However, relatively large switching losses occur in the prior art power inverter circuits, and particularly in pulse-width modulated power inverters which employ a filter choke in the output circuit. These switching losses occur because, under normal conditions, as each switching transistor is rendered conductive, the full power supply voltage remains applied across it, and the current flow through the transistor increases from a minimum to a maximum before the applied voltage drops to its minimum value. Large power losses occur, therefore, in each switching cycle of the inverter during the intervals when the voltage and current are both high on each of its switching transistors. This condition causes the power inverter to be inefficient in its operation, and it also causes transistor heating to be a problem. The condition is especially aggravated if the power inverter is operating at a relatively high frequency.

The large power losses of the prior art power inverter circuits, due to the causes described in the preceding paragraph, are obviated in the circuit of the present invention by incorporating a saturable reactor into the circuit. The saturable reactor effectively prevents a condition of high voltage and high current from occurring simultaneously in the individual switching transistors.

DETAILED DESCRIPTION OF THE ILLUSTRATED EMBODIMENTS

Figure 1:
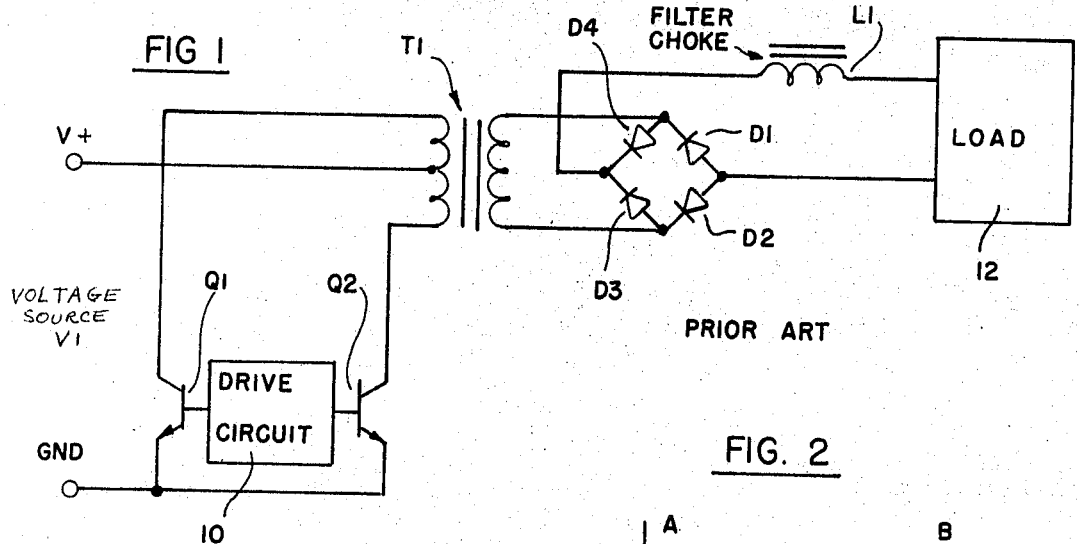
FIG. 1 is a diagram, partially in block form and partially in circuit detail, of a typical prior art power inverter circuit in which the concept of the present invention may be incorporated.

As mentioned above, power inverter circuits frequently employ transistor switches to connect a transformer winding to a direct-current voltage source alternately in each of the two connections, so as to produce an alternating-current in that winding. An example of such a circuit is shown in FIG. 1. The circuit of FIG. 1 includes a transformer T1 having a primary winding and a secondary winding. The primary winding has a center tap which is connected to the positive terminal V+ of a direct current power supply. The primary winding is also connected to the collectors of a pair of NPN transistors Q1 and Q2, the emitters of which are connected to ground, as is the negative terminal of the direct voltage power supply.

An appropriate drive circuit 10 is connected to the base electrodes of the transistors Q1 and Q2, so that the transistors may be driven in an alternate manner, to cause one side and the other of the primary winding of the transformer T1 cyclically to be connected across the direct-current voltage power supply. The secondary winding of the transformer T1 is connected to a full-wave bridge rectifier formed of four diodes D1, D2, D3 and D4. The bridge rectifier is connected through a filter choke L1 to a load designated 12.

In the circuit of FIG. 1, when one of the transistors Q1 and Q2 is rendered conductive by the drive circuit 10, it initially has the entire direct-current supply voltage applied across its collector and emitter. The current in the transistor then increases to a maximum value, and this occurs before the voltage is reduced to a minimum. The resulting load line of the transistor is illustrated by the curve of FIG. 2.

Figure 2:
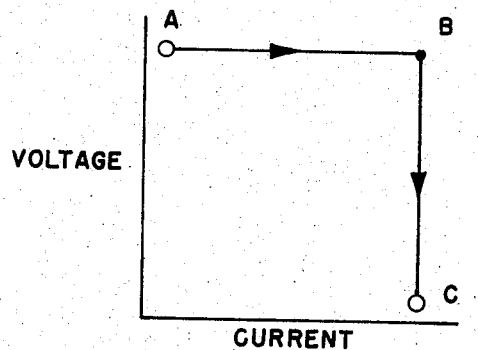
FIG. 2 is a cruve representing an operational characteristic of the circuit of FIG. 1.

Specifically, and as shown in FIG. 2, the operating point of each switching transistor is initially point A, when the transistor is non-conductive. Then, as the transistor is switched on, its operating point normally proceeds along the path from A to B as the current increases, and then from B to C as the voltage reduces to a minimum value. Point A on the curve of FIG. 2 where the voltage is maximum and the current is minimim, is a point at which the power loss is small. Point C on the curve, at which which the current is maximum and the voltage is minimum, is likewise a point at which the power loss is small.

However, in order to proceed from point A to point C, the operating point of the transistor in the prior art circuit is in the region of the point B for a period of time, which is a point of large power loss, since the voltage and current are both high at that point. If the inverter operates at a relatively high frequency, the operating point of each switching transistor will occur in the region of the point B for a significant fraction of each cycle time, and the inverter will consequently be inefficient and transistor heating will be a problem.

Figure 3:
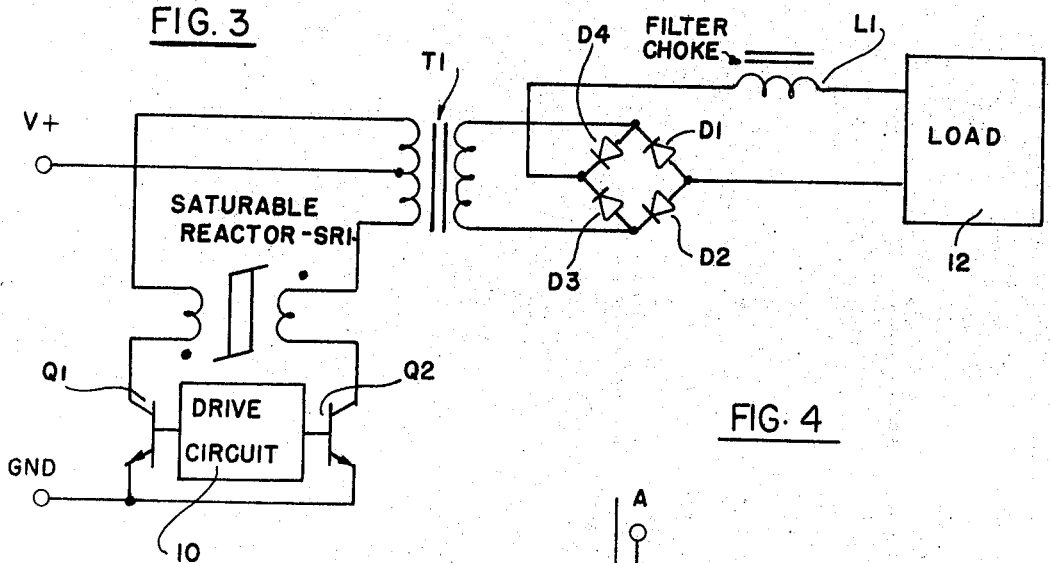
FIG. 3 is a diagram, partially in block form and partially in circuit detail, showing the circuit of FIG. 1 modified to incorporate the teaching of the present invention.

In the circuit of FIG. 3, a saturable reactor designated SR1 is interposed between the collector electrodes of the transistors Q1 and Q2 and the primary winding of the transformer T1. This saturable reactor SR1 permits the operating point of each switching transistor to proceed from point A to point C without going through the high power dissipation point B of FIG. 2. The saturable reactor SR1 is connected in series with the transistor switches Q1 and Q2, and it is constructed to support the number of volt-seconds necessary to allow the voltage of each switching transistor to decrease to the minimum saturation voltage level before it will allow significant load current to flow through the switching transistor. The load line then follows the path shown in FIG. 4.

Figure 4:
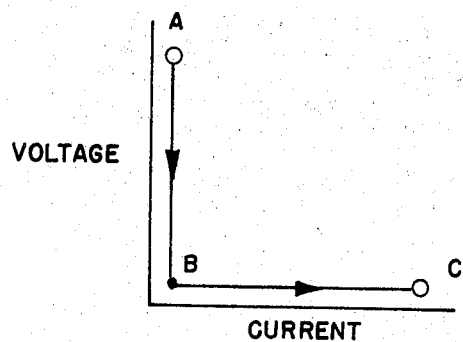
FIG. 4 is a curve illustrating an operational characteristic of the circuit of FIG. 3.

When the drive circuit 10 renders either switching transistor Q1 or Q2 conductive in the circuit of FIG. 3, the voltage decreases to a minimum value, as shown by the operating point moving from A to B in the curve of FIG. 4. Then, as the saturable reactor saturates, the operating point will then proceed from B to C. The switching loss in each switching transistor is thereby reduced, because the operating point never passes through a region where the voltage and current across the transistor are both high.

The saturable reactor SR1 effectively acts as a switch in series with the transistor switches, and which is operated so that each transistor switch closes when the reactor switch is open, and the reactor switch then closes to complete the circuit. Since the reactor switch, which is exposed to the load line of FIG. 2, closes much more rapidly than the corresponding transistor switch, less power is lost during each cycle of operation. In actual practice, for example, each transistor switch may traverse the load line in, for example, 2.0 microseconds, whereas the saturable reactor is capable of traversing the load line in less than 0.5 microseconds, so that the total switching loss is reduced by a factor of 4, or greater.

In the circuit of FIG. 3, the saturable reactor SR1 is reset during alternate operational half-cycles. During one half-cycle, the magnetic flux in the core of the saturable reactor is driven to saturation in one direction, and during the alternate half-cycle, the magnetic flux is driven to saturation in the other direction. The saturable reactor SR1 may, for example, be constructed on a toroidal ferrite core of the type presently designated 846T250-3E2A (two cores stacked), and it may include five turns of No. 25AWG wire on each winding.

Figure 5:
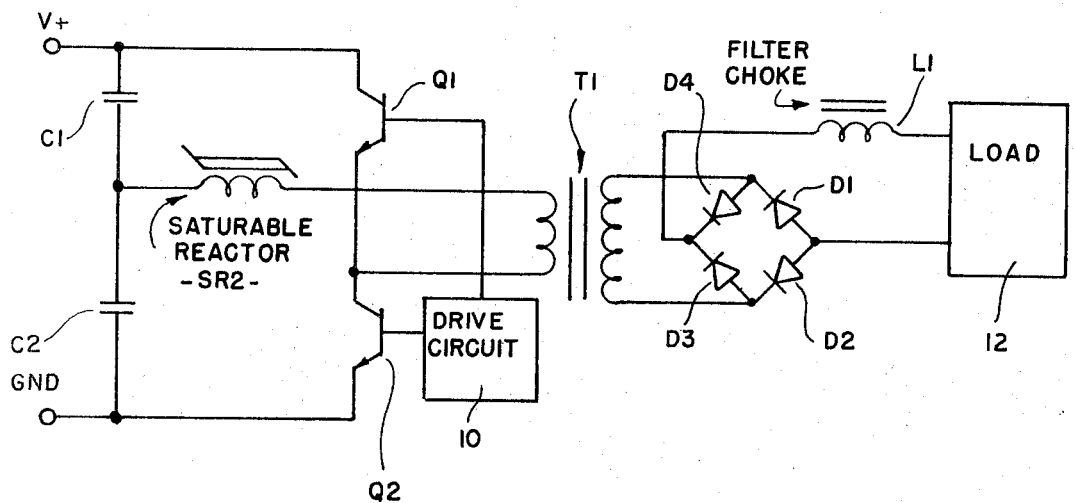
FIG. 5 is diagram, partially in block form and partially in circuit detail, illustrating another embodiment of the invention.

The teaching of the present invention is applied to a different type of power inverter in the circuit of FIG. 5. The power inverter of FIG. 5 is a half-bridge type in which the primary of the transformer does not have a center tap. In the circuit of FIG. 5, one side of the primary winding is connected through a saturable reactor SR2 to the common junction of a pair of capacitors C1 and C2 connected across the direct-current voltage source. The collector of the transistor Q1 iss connected to the positive terminal V+, and the emitter of the transistor Q2 is connected to ground. The other connections of the circuit are essentially the same as the circuit of FIG. 1.

The saturable reactor SR2 in the circuit of FIG. 5 requires only one winding. The operation of the saturable reactor SR2 in the circuit of FIG. 5 is essentially the same as in the previous circuit, and it assures that a high voltage and high current condition will not occur simultaneously in either of the switching transistors Q1 or Q2.

Figure 6:
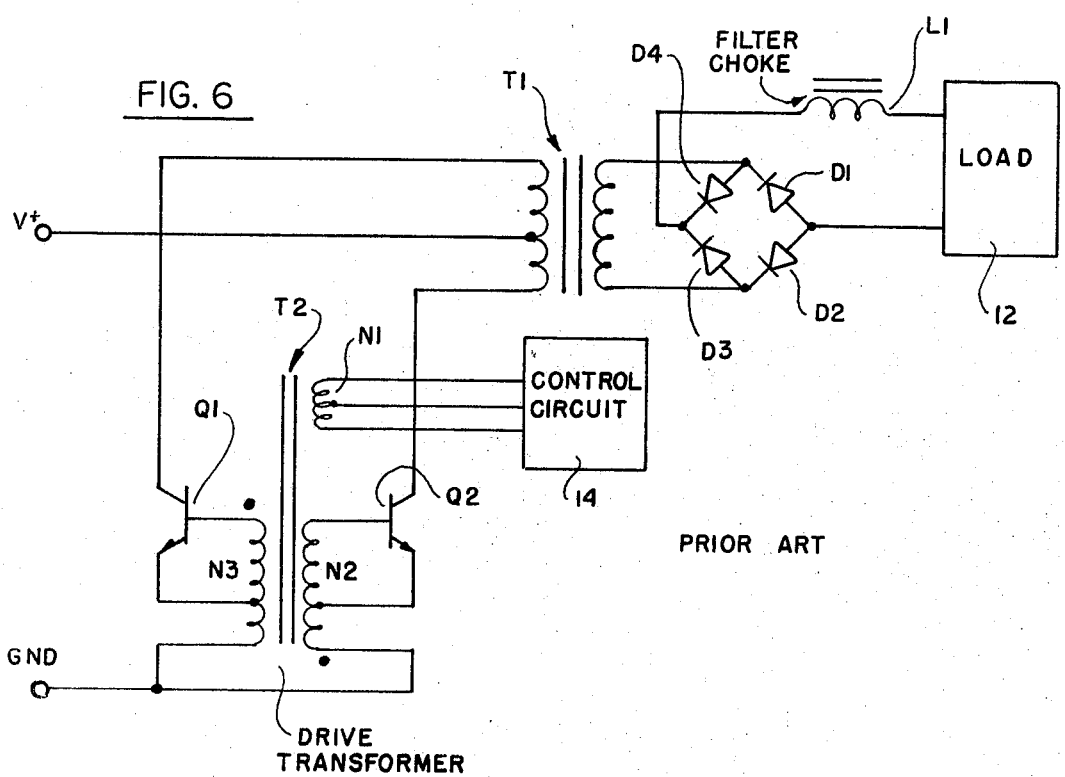
FIG. 6 is a combined circuit and block diagram illustrating another type of prior art power inverter circuit which incorporates a regenerative control.

The prior art circuit of FIG. 6 is one which incorporates a regenerative drive for the switching transistors Q1 and Q2. In the circuit of FIG. 6, the transistors Q1 and Q2 are connected to a pair of windings N3 and N2 of a drive transformer T2, as shown, and a control circuit 14 for the transistors is connected to a further winding N1 of the drive transformer. If a saturable reactor is used in an inverter circuit which has a regenerative drive to the power transistors, such as shown in FIG. 6, a consequential difficulty arises.

Since the regenerative base drive current to the switching transistors in the circuit of FIG. 6 is dependent upon the collector (or emitter) current, there will be very little base current present when the reactor saturates. Consequently, the large sudden collector current flow will cause the activated switching transistor to pull out of saturation momentarily, and to dissipate considerable power before returning to saturation. This effect may be prevented by providing a large source of base current to infuse the transistor junction with charge during the time that the saturable reactor is absorbing volt-seconds. One implementation of the foregoing technique is to add a winding to the saturable reactor which will supply drive current to the regenerative transformer circuit during the time that voltage appears across the saturable reactor. Such a connection is shown in FIG. 7.

Figure 7:
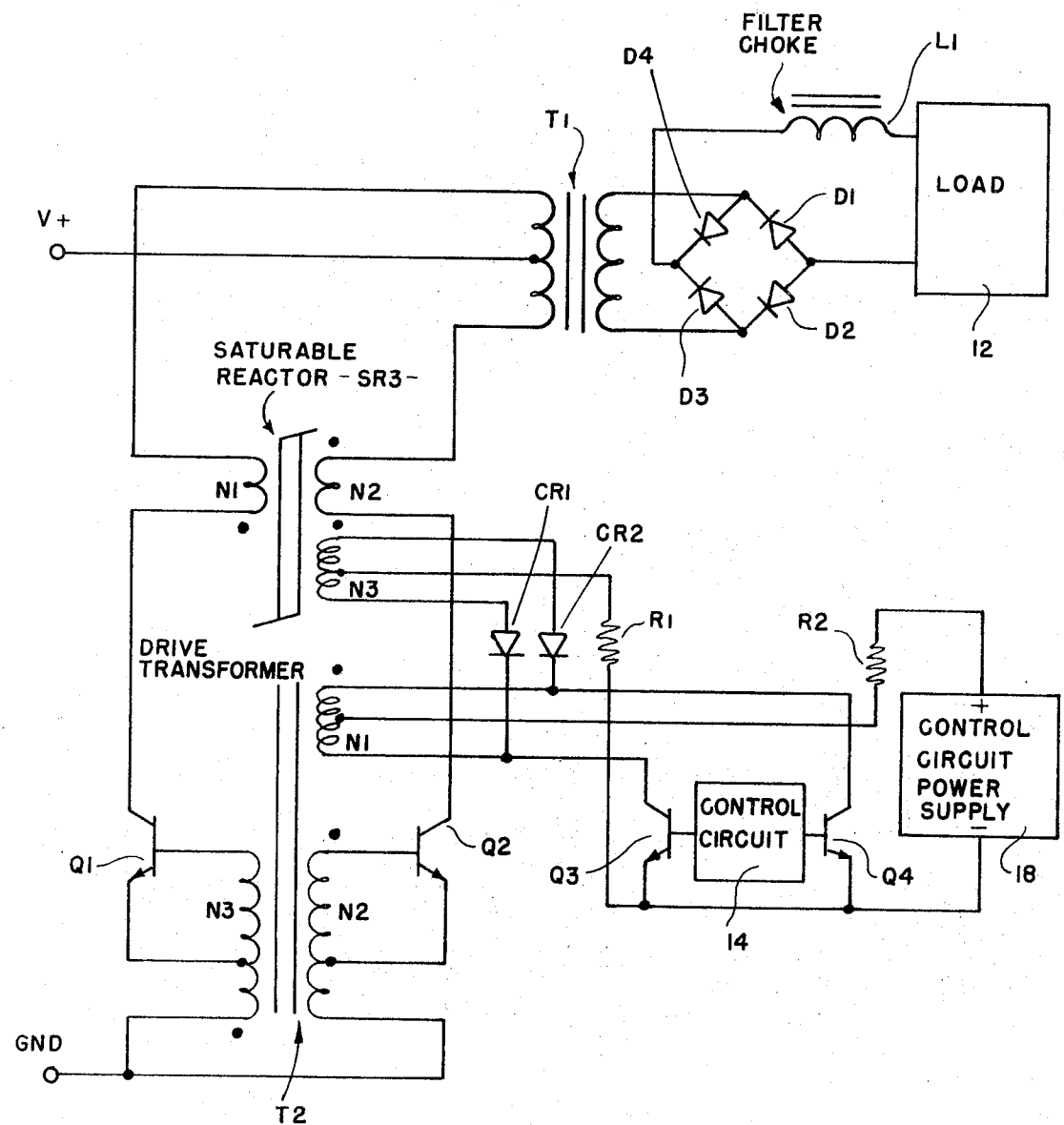
FIG. 7 is a combined circuit and block diagram showing the manner in which the concepts of the present invention may be applied to the circuit of FIG. 6.

In the circuit of FIG. 7, a saturable reactor SR3 has a first winding N1 interposed between the collector of the switching transistor Q1 and the primary winding of the transformer T1, and a second winding N2 interposed between the collector of the transistor Q2 and the primary winding of the transformer T1. The saturable reactor also has a third winding N3 connected through respective diodes CR1 and CR2 to the winding N1 of the drive transformer T2, and having a center tap connected through a 40 ohm resistor R1 to the negative terminal of a control circuit power supply designated by the block 18. The power supply 18 may have a voltage, for example, of 15 volts (D.C.). The main source of V+ may have a value of 150 volts (D.C.). The positive terminal of the power supply 18 is connected through a 30 ohm resistor R2 to the center tap of the winding N1 of the drive transformer T2. The control circuit 14 is connected to the base electrodes of a pair of NPN transistors Q3, Q4 whose collectors are connected to the winding N1 of the drive transformer, and whose emitters are returned to the negative terminal of the power supply 18. The transistors Q3 and Q4 may each be of the type persently designated 2N2222. The winding N3 of the saturable reactor SR3 supplies current to the winding N1 of the drive transformer T2.

In the operation of the system, the control circuit 14 initially renders the transistor Q4 non-conductive, and the transistor Q3 conductive, so that voltage from the control circuit power supply 18 is developed across the lower portion of the winding N1 of the drive transformer T2 through the resistor R2. Current which flows from the control circuit power supply 18 through the resistor R2 and back to the power supply through the transistor Q3 causes current to flow through the winding N2 of the drive transformer and through the base-emitter junction of the transistor Q2. When the transistor Q2 is rendered conductive, voltage appears across the winding N2 of the saturable reactor SR3 which is nearly equal to the supply voltage V+.

The voltage across the saturable reactor winding N2 causes a voltage to appear across its winding N3, which in turn causes current to flow through that winding and through the diode CR2, and through the winding N1 of the drive transformer T2, through the transistor Q3, through the resistor R1, back to the winding N3 of the saturable reactor. This latter current is additional to the current already present in the winding N1 of the drive transformer, and it appears as additional base current in the transistor Q2. This additional base current serves to charge the base-emitter junction of the transistor Q2 heavily, so that when the saturable reactor SR3 saturates and causes the collector current of the transistor Q2 suddenly to increase, the transistor will remain saturated.

When the collector current of the transistor Q2 suddenly increases, due to the saturation of the saturable reactor SR3, the additional base drive into the connection of the winding N3 of the reactor to the winding N1 of the drive transformer is removed, and is replaced by the current in the winding N2 of the drive transformer which is caused by the emitter current of the transistor Q2. The emitter current of the transistor Q2 is now large, flowing through a portion of the winding N2 of the drive transformer to ground.

By the circuitry described above, the transistor Q2 is rendered conductive without the simultaneous application of high voltage and high current, which would create high switching losses. The transistor Q2 remains conductive until the transistor Q4 of the control circuit is again rendered conductive to cause the transistor Q2 to become non-conductive. The next portion of the operating cycle occurs when the control circuit 14 renders the transistor Q3 non-conductive. The operation described above is then repeated, but with respect to the other circuit components, such as the transistors Q3 and Q1, and the diode CR1.

It is apparent that the circuitry used in the inverter of FIG. 7 to provide additional base current to the switching transistors can be incorporated into other inverters, such as the inverter of FIG. 5, if a drive transformer is used. Moreover, the drive transformer T2 need not be of the regenerative type, although the need for the additional base current in the switching transistors usually arises as a consequence of using a regenerative drive connection.

Frequently high frequency square wave inverters, whether pulse-width modulated or not, exhibit a particular difficulty which results in excessive power loss in the switching transistors, and which is caused by the need to supply reverse current to the secondary circuit rectifier diodes at the time of transition from the forward conducting state to the reverse blocking condition. In the normal operation of the inverter, the switching transistors conduct on alternate half-cycles, and the rectifier diodes in the secondary circuit conduct on alternate half-cycles.

If the secondary circuit is a bridge circuit, as in FIG. 1, then on one half-cycle two of the bridge diodes conduct, and on the next half-cycle these diodes are reverse-biased and blocking while the other two diodes conduct.

Since the turn-on time of rectifier diodes is usually less than the turn-off time, there will exist an overlap period wherein all four diodes in the bridge are conducting. This results in an apparent short-circuit of the secondary winding, until the diodes which are intended to block during that half-cycle actually switch from their forward conductive to their blocking state.

This momentary short-circuit of the secondary winding of the transformer T1, which occurs in all rectifier arrangements as well as the full bridge type, causes the primary switching transistor Q1 or Q2 which turns on at the start of the half-cycle to experience a momentary surge of current which greatly exceeds the normal load current.

The saturable reactors described above do not avoid this surge current, although they do delay the occurrence of the surge until the transistor is well saturated. Other means must be employed to limit the magnitude of this current to a value which will not pull the transistor out of saturation and cause it to dissipate power.

Such other means may be to use extremely fast recovery rectifier diodes, or to provide a limiting impedance elsewhere in the circuit, such as a choke in series with the input source. However, such means are not always practical.

Figure 8A:
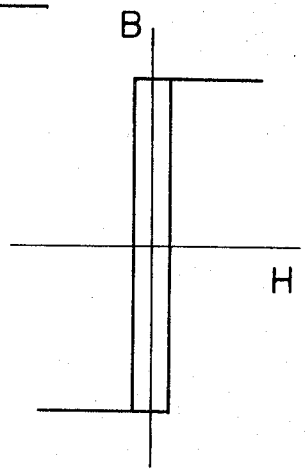
FIGS. 8A – 8C are hysteresis loops for various types of saturable reactor stacked core materials.
Figure 8B:
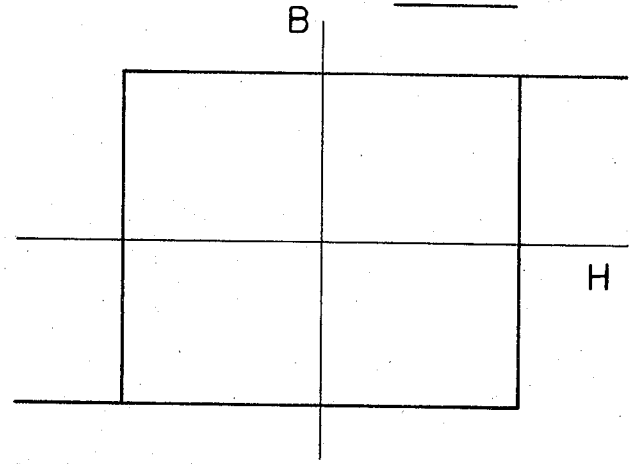
Figure 8C:
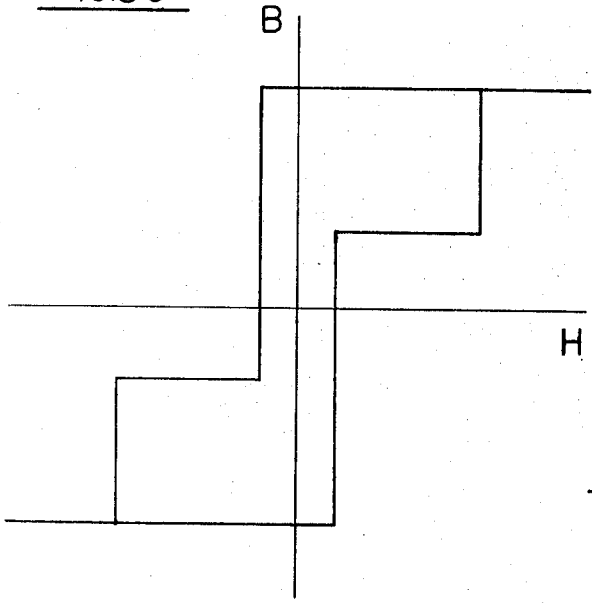

A means for limiting this current surge may be incorporated in the saturable reactor itself. If a core having a relatively large coercive force (FIG. 8B) is stacked with a core having a low coercive force "square loop" core (FIG. 8A) normally used for the saturable reactor, the composite hysteresis loop will be as shown in FIG. 8C. If the resulting stacked cores are wound with a suitable number of turns such that, a current in the winding equal to the maximum current that the switching transistors can handle, results in a number of ampere-turns equal to the coercive force of the high coercive force core, then the following mode of operation will occur:

First the switching transistor Q1 or Q2 (FIG. 3) turns on. The initial collector current is limited by the saturable reactor SR1 to the coercive force of the low coercive force core, expressed in ampere-turns, divided by the number of turns. This current is relatively small, and so the transistor is not exposed simultaneously to high current and high voltage. When the transistor is fully saturated, the volt-second limit of the low coercive force core is reached, and this core saturates. The current then increases to the value determined by the coercive force of the high coercive force core, divided by the number of turns.

This current is the maximum current that the transistor Q1 or Q2 can handle without pulling out of saturation, and is in excess of the normal full load current. The excess current, modified by the turns ratio of the main inverter transformer, appears as reverse current in the rectifier diodes which are to turn off. When the diodes actually turn off and assume the blocking state, the primary current reduces to the normal full load current, until the end of the half-cycle.

At the start of the next half-cycle, the same process repeats, but the alternate transistor conducts, and the current in the composite reactor is reversed, so both cores are reset during the half-cycle.

On each half-cycle, the low coercive force core (FIG. 8A) is driven from maximum flux density in one direction to maximum flux density in the other direction, but the high coercive force core (FIG. 8B) is driven over only a minor hysteresis loop, because this core never reaches saturation, but is limited in flux density by the time required to recover the blocking rectifier.

It should be noticed that there is a significant power dissipation in the high coercive force core, given by the area of the minor hysteresis loop which is traverses multiplied by the frequency of the inverter. The advantage of this circuit is that the power can be dissipated more conveniently in the core of the composite reactor than in the switching transistors, since the reactor may be of almost any arbitrary size, but the junctions of the switching transistors are small and heat sensitive.

Figure 9:
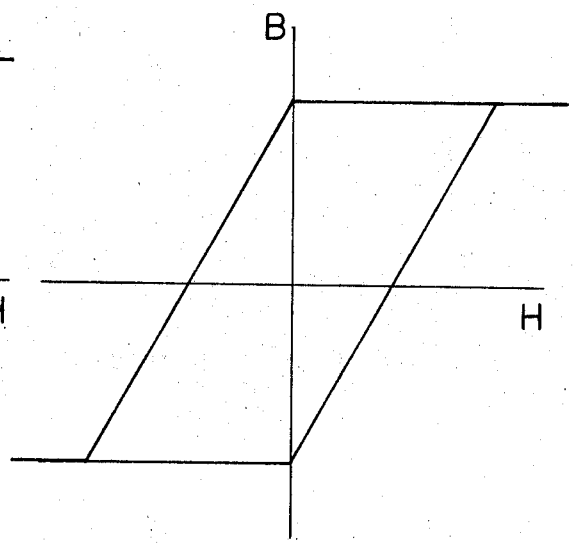
FIG. 9 is a hysteresis loop for a single core.

Several variations of this concept are possible. If, for example, instead of the stacked cores, a single high coercive force core with an air gap is used, the hysteresis loop will be as shown in FIG. 9. This shape approximates that of the composite characteristic of FIG. 8C, and achieves a similar result. The transistor will turn on with very low current, and the current will then increase at a fixed rate until the diode blocks. This embodiment is less desirable than the stacked cores because the area of the portion of the hysteresis loop which is actually traversed is larger than in the case of the stacked cores, and therefore more power is lost.

Another obvious variation is that the saturable reactor, or composite reactor, can be connected in the secondary circuit of the inverter instead of in the primary circuit.

It will be appreciated that although particular embodiments of the invention have been shown and described, modifications may be made. It is intended in the following claims to cover the modifications which fall within the true spirit and scope of the invention.

What is claimed:

1. In a power inverter which includes a transformer having a first winding and a second winding, an output circuit connected to said second winding, switching transistor means connected to said first winding, said switching transistor means including a first transistor having its collector connected to one side of the direct-current voltage source and having its emitter connected to one side of said first transformer winding, and a second transistor having its emitter connected to the other said of the direct-current voltage source and having its collector connected to said one side of said first transformer winding, and a pair of capacitors connected across the voltage source, and a drive circuit connected to said switching transistor means to cause said switching transistor means to connect said first winding to the direct-current voltage source so that direct-current voltage from the source is applied to said first winding with cyclically reversed polarity; and a saturable reactor connected between the junction of said capacitors and the other side of said first transformer winding to control the load current in said transistors and thereby to minimize the time during which a condition of maximum voltage and maximum current occurs with respect to said switching transistor means.

2. In a power inverter which includes a transformer having a first winding and a second winding, an output circuit connected to said second winding, switching transistor means connected to said first winding, said switching transistor means including a first switching transistor and a second switching transistor having their collectors connected to the respective sides of said first transformer winding, and a drive circuit connected to said switching transistor means to cause said switching transistor means to connect said first winding to a direct-current voltage source so that direct-current voltage from the source is applied to the first winding with cyclically reversed polarity; a saturable reactor including first and second windings respectively interposed between said first transformer winding and the collectors of said first and second switching transistors, said saturable reactor including at least one further winding inductively coupled to said first winding of said saturable reactor; and circuitry connected to said further winding of said saturable reactor and to said switching transistor means for supplying additional drive current to said switching transistor means at predetermined times in each operating cycle thereof, said circuitry including a drive transformer having a first winding connected to said further winding of said saturable reactor, and having second and third windings respectively connected to the bases of said switching transistors.

3. The system defined in claim 2, in which said circuitry further includes control circuit means for selectively controlling the current flow through said first winding of said drive transformer.

4. The system defined in claim 3, in which said drive transformer is connected in regenerative circuit.

* * * * *